United States Patent [19]
Jones, Jr.

[11] Patent Number: 5,781,768
[45] Date of Patent: Jul. 14, 1998

[54] GRAPHICS CONTROLLER UTILIZING A VARIABLE FREQUENCY CLOCK

[75] Inventor: Morris E. Jones, Jr., Saratoga, Calif.

[73] Assignee: Chips and Technologies, Inc., San Jose, Calif.

[21] Appl. No.: 625,732

[22] Filed: Mar. 29, 1996

[51] Int. Cl.⁶ .................................................. G06F 1/06

[52] U.S. Cl. .................................................. 395/556

[58] Field of Search .............................. 395/556

[56] References Cited

U.S. PATENT DOCUMENTS

| | | | |
|---|---|---|---|
| 5,285,197 | 2/1994 | Schmidt et al. | 345/213 |
| 5,481,697 | 1/1996 | Mathews et al. | 395/556 |
| 5,586,309 | 12/1996 | Lin | 395/556 |

*Primary Examiner*—Thomas M. Heckler
*Attorney, Agent, or Firm*—D'Alessandro & Ritchie

[57] ABSTRACT

The present invention includes a memory clock system for a graphics controller including a plurality of clock pulse generators, and a clock controller which selects the clock frequency based on the state of the graphics controller functional units.

5 Claims, 2 Drawing Sheets

5,781,768

GRAPHICS CONTROLLER UTILIZING A VARIABLE FREQUENCY CLOCK

BACKGROUND OF THE INVENTION

The present invention relates generally to a system and method for providing multiple clock rates for a graphics controller depending on what functions are being performed at a given time.

Prior art graphics controllers use memory clocks which operate at only a single frequency. A preferred embodiment of the present invention recognizes the direct relationship between memory clock frequency and power consumption and uses a variable frequency memory clock to reduce power consumption.

The power consumed by a chip is the current consumed by the chip multiplied by the voltage at which the chip operates, or:

$$P=IV,$$

The current consumed by a chip is directly related to capacitance, voltage, and frequency as follows:

$$I \sim CVF,$$

The power consumed by the chip is therefore:

$$p \sim CV^2F,$$

Thus, power consumption may be reduced by either reducing the capacitance of the devices on the chip, the voltage on the chip, or the frequency at which the chip operates. The capacitance is related to the devices which are constructed on the chip. The number and type of devices required on the chip are determined by the functions which the chip must perform. In most cases, it is fixed by the required product function. The voltage on the chip may be varied, but product requirements usually fix it at approximately 3.3 Volts to facilitate interface to other components. The frequency is determined by the required memory bandwidth.

The goal in a flat panel graphics controller chip is to reduce the power consumption as much as possible. The capacitance and voltage of the chip are generally fixed by product requirements. Significant reduction in power consumption, however, could be accomplished if a way to reduce the required memory bandwidth and therefore the frequency were provided.

The required frequency of operation of a graphics chip is given by the following expression:

$$F=K_{bw}*(B_{display}+B_{cpu}+B_{GUI}+B_{acc}),$$

Where:

| | |
|---|---|
| $K_{bw}$ | Constant to convert bandwidth to frequency. Determined by the architecture of the memory controller. |
| $B_{display}$ | Bandwidth required to display the screen data |
| $B_{CPU}$ | Bandwidth required for CPU functions (Performance related) |
| $B_{GUI}$ | Bandwidth required for screen manipulation by the graphics acceleration engine in addition to the CPU bandwidth. (Performance related) |
| $B_{acc}$ | Bandwidth required for accessory functions such as cursors, pop up windows, multi-media, DRAM refresh, and storage buffers for dual drive flat panels displays. |

Prior art systems are engineered to provide enough bandwidth to handle the maximum possible total bandwidth requirement. This is typically about twice the display bandwidth. Prior art systems are engineered for this worst case environment, and the clock rate is set accordingly. During periods when the bandwidth requirement of the system is reduced, the clock rate still remains set at the rate determined by the maximum bandwidth requirement. Power consumption could be reduced if a lower clock rate than the clock rate engineered for the maximum bandwidth requirement could be used when the bandwidth requirement is less than the maximum.

SUMMARY OF THE INVENTION

Accordingly, the present invention provides a system and method of using multiple clock rates that are selected based on the functions being performed by the graphics chip at a given time. The clock rate selected provides adequate bandwidth for the functions provided without any loss in performance. Intermittent use of a lower clock rate results in lower overall power consumption by the graphics controller.

Additional objects and advantages of the invention will be set forth in part in the description which follows, and will become apparent to those skilled in the art upon examination of the following, or may be learned by practice of the invention. The objects and advantages of the invention may be realized and obtained by means of the instrumentalities and combinations particularly pointed out in the claims.

BRIEF DESCRIPTION OF THE DRAWINGS

The accompanying drawings, which are incorporated in and constitute a part of the specification, schematically illustrate a preferred embodiment of the invention and, together with the general description given above and the detailed description of the preferred embodiment given below, serve to explain the principles of the invention.

DESCRIPTION OF THE PREFERRED EMBODIMENT

Reference will now be made in detail to the preferred embodiment of the invention, which is a system and method for providing a variable frequency clock for a graphics controller. An example of the preferred embodiment is illustrated in the accompanying drawings. While the invention will be described in conjunction with that preferred embodiment, it will be understood that it is not intended to limit the invention to one preferred embodiment. On the contrary, it is intended to cover alternatives, modifications, and equivalents as may be included within the spirit and scope of the invention as defined by the appended claims.

In a typical computer environment the screen is displayed at a 100% rate, the accessories are used about 15% of the time, and the CPU and GUI functions are used about 10% of the time. This results in an average frequency of:

$$F=K_{bw}*(B_{display}+.1*B_{cpu}+0.1*B_{GUI}+0.15*B_{acc})$$

Since the other factors are each about the same as $B_{display}$, approximately 0.35 * 0.5 or 0.175 times the frequency required for $B_{display}$ is required in addition the frequency required for $B_{display}$. Thus, the average frequency requirement is 0.5 +0.175 =0.675, or 68% of the typical engineered frequency. Operating the clock at this average frequency would result in a reduction of 32% in bandwidth, and in a proportional reduction in power consumption in the graphics controller.

Figure 1:
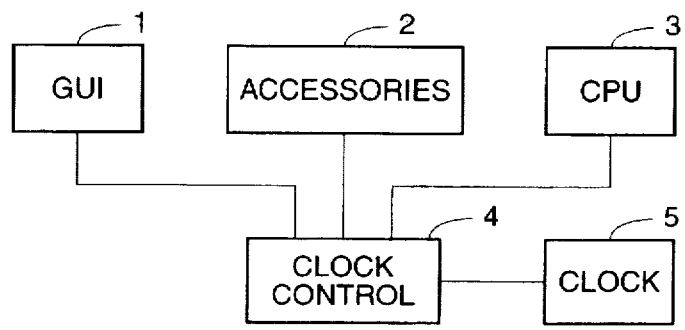
FIG. 1 is a block diagram depicting a system for controlling the clock frequency.

FIG. 1 shows a general system for implementing frequency reduction based on the activity level of the system.

Each major functional unit, including GUI 1, Accessories 2 and CPU 3, provides a signal to a Clock Control 4 indicating whether the respective functional unit is active or inactive, and Clock Control 4 selects an appropriate signal to Clock 5 based on the programming of Clock Control 4 and the amount and type of activity. In a simple system, Clock Control 4 would be programmed so that, when there is no activity, the frequency would be the maximum engineered rate divided by two (enough for the display only), and when any activity occurs, the frequency would be the maximum engineered clock rate. Systems utilizing more complex clock control schemes could also be used. More than two clock control speeds could be selected based on the number of functional units active at a given time or based on which specific functional units are active. Continuous clock variation could also be used if warranted by the application.

The activity of each functional unit may be indicated by the functional units not being idle, by FIFO depths in each functional unit, and by the position of the display beam for multi-media and popup accessories.

Other data may be sent to Clock Control as a basis for clock frequency adjustment. In the analysis above, $B_{display}$ was considered to be constantly utilized at a 100% rate, but the display is not uniform in memory bandwidth requirements, and an improvement can be made that allows the M clock to be reduced during the blanking intervals when the display is not fetching any data. This could reduce the power consumption another 5–10% depending on the graphics timing of the display.

Figure 2:
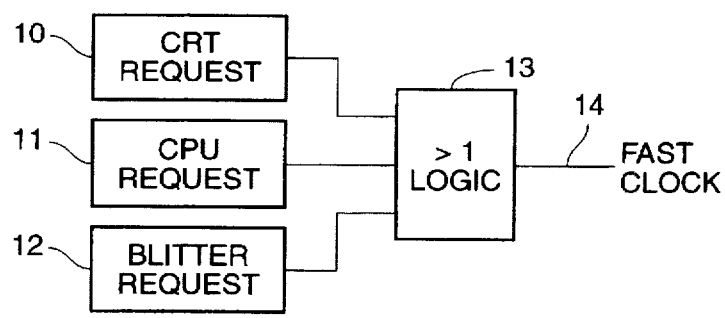
FIG. 2 is a block diagram depicting a preferred embodiment of the clock control logic.

FIG. 2 shows a preferred embodiment of a clock controller. A typical graphics controller contains several functional units communicating with the memory controller. These typically have a request mechanism. The memory clock may be changed based on the number of pending requests. The CRT Request 10 represents a memory access request from the CRT display engine, the CPU Request 11 represents a request from the CPU or Bus interface, and the Blitter Request 12 represents a request from graphics acceleration logic such as BitBlt or line draw hardware.

The >1 logic block 13 can be implemented by the following truth table:

| CRT | CPU | Blt | Fast |
|-----|-----|-----|------|
| 0 | 0 | 0 | 0 |
| 0 | 0 | 1 | 0 |
| 0 | 1 | 0 | 0 |
| 0 | 1 | 1 | 1 |
| 1 | 0 | 0 | 0 |
| 1 | 0 | 1 | 1 |
| 1 | 1 | 0 | 1 |
| 1 | 1 | 1 | 1 |

Figure 3:
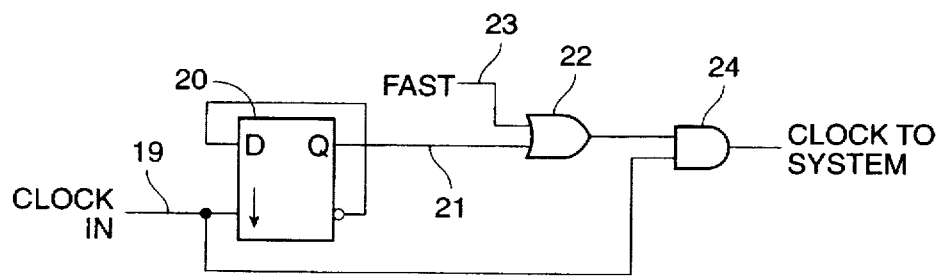
FIG. 3 is a block diagram depicting a preferred embodiment of the circuit used to switch the clock frequency.

Since the clock required when the CPU and/or Blitter are operating is normally twice the CRT only clock, the circuit shown in FIG. 3 could be used to implement the clock switching. Clock In 19 is the system clock engineered for the worst case scenario. Flip flop 20 outputs at line 21 a signal at half the clock frequency. OR gate 22 outputs either a constant high signal or the half frequency signal depending on whether the Fast Input 23 is enabled. AND gate 24 outputs a signal that is either half the frequency of Clock In 19 or the same frequency as Clock In 19 depending on the state of the Fast Input 23. Thus, when the fast mode is enabled, every clock pulse will be let through, when it is not, then every second clock pulse will be let through. This circuit should reduce the power consumption in the chip considerably.

A more complex clock control scheme may be designed using the bandwidth requirements of each function. For example, the following bandwidths may be required:

Horizontal and vertical Display Enable (DE) - 85 Mb/sec when active

GUI Engine (GUI)- 100 Mb/sec when active

Video (VID) - 28 Mb/sec when active.

The appropriate clock frequency may be selected from among, for example, CLK =220 Mb/sec, CLK/2=110 Mb/sec and CLK/4=55 Mb/sec, based on the total bandwidth required as follows:

| DE | GUI | VID | BW | CLK = 220 Mb/sec | CLK/2 = 110 Mb/sec | CLK/4 = 55 Mb/sec |
|----|-----|-----|-----|------|------|------|
| 0 | 0 | 0 | 0 | | | ✓ |
| 0 | 0 | 1 | 28 | | | ✓ |
| 0 | 1 | 0 | 100 | ✓ | | |
| 0 | 1 | 1 | 128 | ✓ | | |
| 1 | 0 | 0 | 85 | | ✓ | |
| 1 | 0 | 1 | 113 | ✓ | | |
| 1 | 1 | 0 | 185 | ✓ | | |
| 1 | 1 | 1 | 213 | ✓ | | |

The clock select signals may then be generated by:

CLK =DE·GUI+VID·GUI+DE·VID

CLK/2=$\overline{DE}$·GUI·$\overline{VID}$+DE·$\overline{GUI}$·VID

CLK/4=$\overline{DE}$·$\overline{GUI}$

Figure 4:
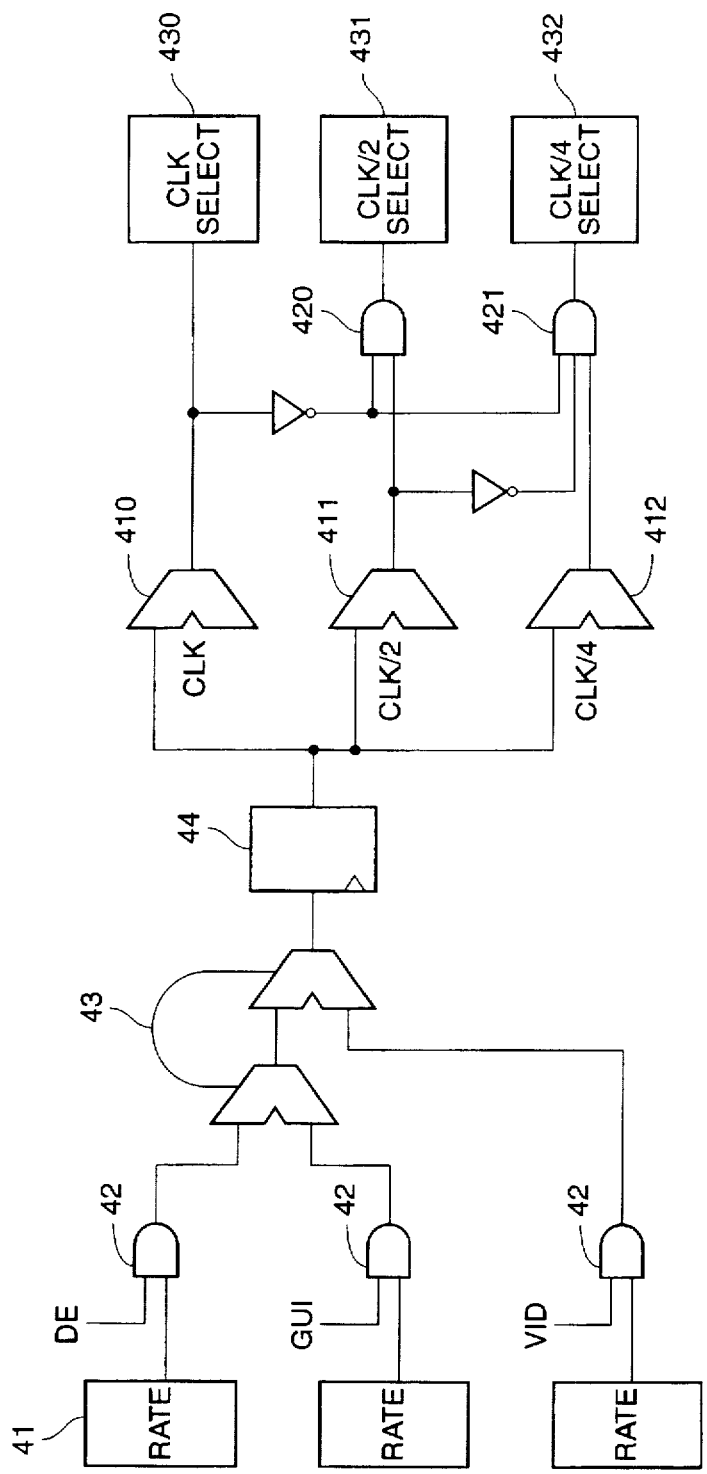
FIG. 4 is a block diagram depicting a preferred embodiment of clock control logic.

It will be apparent to one of ordinary skill in the art that the following design could be modified to adjust to other requirements. Alternatively, adders could be used as shown in FIG. 4.

Programmable rate inputs 41 are input to AND gates 42, along with enable signals from DE, GUI, and VID. The outputs from the AND gates are routed through adders 43 and through cycle point 44, if needed, to comparators 410, 411 and 412. The other inputs to comparators 410, 411 and 412 are the minimum rates for which the CLK, CLK/2, and CLK/4 signals are respectively required.

AND gates 420 and 421 determine the proper clock select signals to clocks CLK, CLK/2 and CLK/4. Cycle points 430, 431 and 432 are used if necessary. Alternatively, the control signals could be input to a Phase Locked Loop. In the example shown, the clock rates used were CLK, CLK/2 and CLK/4. Alternatively, fully programmable clock rates could be used.

In general, each functional unit has a state machine. These state machines can indicate when the unit is busy. This allows a speed up when internal processing is occurring, and not just when the memory controller is busy. Graphics chips are typically composed of a number of functions. These include Hardware cursors and popup menus that fetch data from system memory. These are active for a very short period each screen refresh. These units can also indicate when they are active, and increase the memory clock.

If a large number of functional units are present in the chip, then a system with multiple clock speeds can be implemented. The other units typically do not add up to a multiple of the CRT bandwidth requirement. This would require a second clock frequency source, or fast changing phase locked loop for efficient implementation. Some examples of other functions' bandwidth are:

| Function | Bandwidth Mb/Sec |
|---|---|
| Multi-media in | 4.61 |
| Multi-media out | 11.52 |
| Cursor sprite | 0.02 |
| Pop-up Menu | 0.31 |
| Total | 16.45 |

If a design included multi-media in, then a system could be constructed so that a slow clock is used whenever the Multimedia input and CRT are the only components operating. Such a system would switch to the fast mode only if the sum of the bandwidths exceeded the memory system capacity in the slow clock. The conditions for a fast or slow clock would be captured in logic, stored in a RAM, or implemented in a ROM, and then used to select the system operating speed. The conditions and logic implementation ensure that the bandwidths required meet the system requirements.

In summary, an apparatus and method for providing a variable memory clock in a graphics controller has been described.

The foregoing description of the preferred embodiment of the invention has been presented for purposes of illustration and description. It is not intended to be exhaustive or to limit the invention to the precise form disclosed, and many modifications and variations are possible in light of the above teaching. The preferred embodiment was chosen and described in order to best explain the principles of the invention and its practical applications to thereby enable others skilled in the art to best utilize the invention and various embodiments, and with various modifications as are suited to the particular use contemplated.

It is intended that the scope of the invention be defined only by the appended claims.

What is claimed is:

1. A memory clock system for a graphics controller having functional units which includes: a plurality of clock pulse generators, a clock controller including, input lines having a state, said state being determined by the activity of said functional units, clock control logic circuitry responsive to the state of said input lines, an output signal line, said output signal line connected to each of said plurality of clock pulse generators wherein the clock control logic circuitry sends a signal on the output signal line, the signal indicating which of the clock pulse generators is to be active, whereby said clock controller causes said plurality of clock pulse generators to generate clock pulses at a predetermined frequency for use by the graphics controller based on the state of said functional units.

2. The clock system of claim 1 wherein the state of the input lines is further determined by the bandwidth requirements of the functional units.

3. A memory clock system for a graphics controller as recited in claim 1 wherein the functional units include a graphics accelerator engine, a CPU, and accessory function.

4. A memory clock system for a graphics controller as recited in claim 1 wherein the plurality of clock pulse generators includes a slow clock pulse generator and a fast clock pulse generator and wherein the clock control logic circuitry causes the slow clock pulse generator to generate clock pulses when at least one of the functional units is active and wherein the clock control logic circuitry causes the fast clock pulse generator to generate clock pulses when none of the functional units are active.

5. A memory clock system for a graphics controller having functional units which includes: a variable clock pulse generator, a clock controller including, input lines having a state, said state being determined by the activity of said functional units, clock control logic circuitry responsive to the state of said input lines, an output signal line, said output signal line connected to the variable clock pulse generator, wherein the clock control logic circuitry sends a signal on the output signal line the signal indicating a clock frequency to be generated by the variable clock pulse generator, whereby said clock controller causes said variable clock pulse generator to generate variable rate clock pulses for use by the graphics controller based on the state of said functional units.

* * * * *

UNITED STATES PATENT AND TRADEMARK OFFICE
CERTIFICATE OF CORRECTION

PATENT NO.   :   5,781,768
DATED        :   July 14, 1998
INVENTOR(S)  :   Morris E. Jones It is certified that error appears in the above-identified patent and that said Letters Patent is hereby corrected as shown below:

---At column 1, line 24, replace "i~CVF," with --i~ CVF--.

---At column 1, line 26, replace "p~CV$^2$F," with --p ~ CV$^2$F--.

---At column 1, line 50, replace "K$_b$w" with --K$_{bw}$--.

---At column 1, line 50, replace "B$_{cpu}$" with --B$_{CPU}$--.

---At column 1, line 50, replace "B$_{GUi}$ with --B$_{GUI}$--.

---At column 2, line 64, replace "B$_{cpu}$" with --B$_{CPU}$--.

---At column 2, line 64, replace "B$_{GUi}$" with --B$_{GUI}$--.

---At column 4, line 27, delete "√" from the row starting with "0 1 0 100" and the column starting with "CLK =".

---At column 4, ine 27, insert "√" in the row starting with "0 1 0 100" and the column starting with "CLK/2 =".

---At column 6, line 40, after "line" insert --,--.

Signed and Sealed this

Twelfth Day of January, 1999

Attest:

Attesting Officer

*Acting Commissioner of Patents and Trademarks*